(12) United States Patent
Yasui

(10) Patent No.: US 6,223,607 B1
(45) Date of Patent: May 1, 2001

(54) TORQUE DETECTOR

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/197,491

(22) Filed: Nov. 23, 1998

(30) Foreign Application Priority Data

Jul. 9, 1998 (JP) .................................................. 10-194338

(51) Int. Cl.$^7$ ....................................................... G01L 3/02
(52) U.S. Cl. ..................................................... 73/862.333
(58) Field of Search ...................... 73/862.334, 862.335, 73/862.336, 862–862.333

(56) References Cited

FOREIGN PATENT DOCUMENTS 3-285130  12/1991  (JP) .

Primary Examiner—Benjamin R. Fuller
Assistant Examiner—Abdullahi Aw-Musse
(74) Attorney, Agent, or Firm—Sughrue, Mion, Zinn, Macpeak & Seas, PLLC

(57) ABSTRACT

A cage 100 comprising rings 101*a*, 101*b* and a plurality of elastic rods 102 are secured to facing ends 20*c*, 30*c* of an upper shaft 20 and a lower shaft 30, and movable elements 200 are secured to and span two of the elastic rods 102. Wings 203, 213 on the movable elements 200 are displaced radially by a large amount in response to a slight twisting of the elastic rods 102. This radial displacement is detected by a detection means, such as coils 41*a*, 41*b*, which generates a magnetic flux in a magnetic circuit which includes the wings 203, 213 and detects the displacement as electromagnetic change. The tips of the wings 203, 213 extend axially along the elastic rods and the wings 203, 213 are displaced radially in accordance with changes in the attitude of body portions 201 in response to changes in torque. Two wings 203, 213 and two detection means 41*a*, 41*b* are disposed facing each other for each body portion 201.

16 Claims, 2 Drawing Sheets

TORQUE DETECTOR

BACKGROUND OF THE INVENTION

1. Field of the Invention

The present invention relates to a torque detector for detecting torque without direct contact when an external force is applied to the rotating shaft of an automobile power-steering mechanism, etc.

2. Description of the Related Art

In an automobile power-steering mechanism, it is necessary to detect the amount of torque being applied to the steering wheel to determine the amount of power assistance required. The torque detector disclosed in Utility Model Laid Open No. 3-285130 is a known example of a conventional torque detector for this purpose. The construction of this device will be explained with reference to FIG. 5. In the figure, an upper shaft 2, which is attached to a steering wheel (not shown) and which is supported by a bearing 5a so as to be able to rotate freely, and a lower shaft 3, which is attached to the pinion gear of a steering mechanism (not shown) and which is supported by bearings 5b, 5c so as to be able to rotate freely, are disposed within a housing 1. A torsion bar 4, which is secured at its upper end to the upper shaft 2 by a pin 6 and is supported at its lower end by a bush 7 in the lower end of the upper shaft 2 so as to be able to rotate freely and at the same time is secured to the lower shaft 3, is disposed within the upper shaft 2 and lower shaft 3 so as to be disposed on the central axis of these shafts and is connected so as to be elastic in the direction of shaft twisting between the upper shaft 2 and lower shaft 3.

A first cylinder 10, which is composed of soft magnetic material and is secured to the upper shaft 2, has tooth portions 12 comprising a plurality of protrusions disposed equidistantly around it. A second cylinder 11, which is composed of soft magnetic material and is secured to the lower shaft 3, has tooth portions 13 comprising a plurality of protrusions disposed equidistantly around it. A coil 15, which detects changes in magnetic resistance between the first cylinder 10 and the second cylinder 11, is disposed radially outwards from the first cylinder 10 and the second cylinder 11.

Next, the operation will be explained. When torque is applied to the upper shaft by the steering wheel, torsional deformation occurs in the torsion bar 4, and angular shear occurs due to relative rotation between the first cylinder 10 and second cylinder 11, which are attached to the upper shaft 2 and the lower shaft 3, respectively, that is, relative angular displacement occurs between the upper shaft 2 and the lower shaft 3. When this happens, the surface area of the overlap which forms a magnetic circuit between the tooth portions 12 and 13 disposed on each of the cylinders changes and thus the magnetic resistance between the first cylinder 10 and the second cylinder 11 changes.

The torque can be determined by detecting this change in the magnetic resistance by means of the coil 15. However, in practice not only is torque being applied between the upper shaft 2 and lower shaft 3, but bending forces as well. The torsion bar 4, which connects the upper shaft 2 to the lower shaft 3, has little flexural rigidity and cannot withstand the bending forces on its own. For that reason, bending forces are prevented from being applied to the torsion bar by supporting it at both ends by means of the pin 6 and the bush 7.

Because the conventional torque detector is constructed in the manner described above, the torsion bar 4 requires a certain length and torsional rigidity corresponding to the relative angular displacement occurring between the upper shaft 2 and the lower shaft 3, but the longer the torsion bar is, the smaller its flexural rigidity becomes. Thus, in order to prevent the magnetic resistance between the first cylinder 10 and the second cylinder 11 from changing due to bending forces, there is a need to increase the rigidity of the upper shaft 2, the lower shaft 3, etc., and at the same time to use many supports, such as bushes and bearings. The problem is that increasing the number of supports leads to a loss of torque due to friction in the supports, and making the construction more complicated increases production costs.

SUMMARY OF THE INVENTION

The present invention aims at solving such problems and an object of the present invention is to provide a torque detector of simple construction with little loss of torque.

The torque detector according to the present invention is a torque detector for detecting the torque acting mutually between a first shaft and a second shaft which are arranged end to end on a common axis and comprises: a plurality of elastic rods, which are secured at each end to the facing ends of the first shaft and the second shaft and are each able to twist in response to the torque; at least one movable element with wings, each of which is secured to and spans two of the elastic rods and is displaced radially with respect to the common axis in response to the twisting of the elastic rods; and a detection means, which is disposed so as to face the wings radially to the axis and which generates a magnetic flux in a magnetic circuit which includes the wings and detects radial displacement of the wings as electromagnetic change.

According to the torque detector of the present invention, the elastic rods may be secured to the first shaft and the second shaft by means of a pair of annular members.

The torque detector according to the present invention is also characterized in that each of the movable elements may comprise: a pair of legs composed of elastic bodies, the trunk of one of which is positioned radially outwards from the trunk of the other and whose ends are secured in the securing positions separated from each other axially along the different elastic rods; and a body portion, which is connected to the root of each of this pair of legs; wherein the roots of the wings are connected to the body portion and the tips of the wings extend axially along the elastic rods, and the wings are displaced radially in accordance with changes in the attitude of the body portion in response to changes in the torque.

According to the torque detector of the present invention, each of the body portions may comprise a flat surface positioned at an angle to an imaginary straight line drawn between the securing positions.

According to the torque detector of the present invention, two wings and two detection means may be disposed facing each other for each body portion.

According to the torque detector of the present invention, the entire body of each movable element may be formed from a single sheet of soft magnetic material.

DETAILED DESCRIPTION OF THE PREFERRED EMBODIMENTS

Embodiment 1

Figure 1:
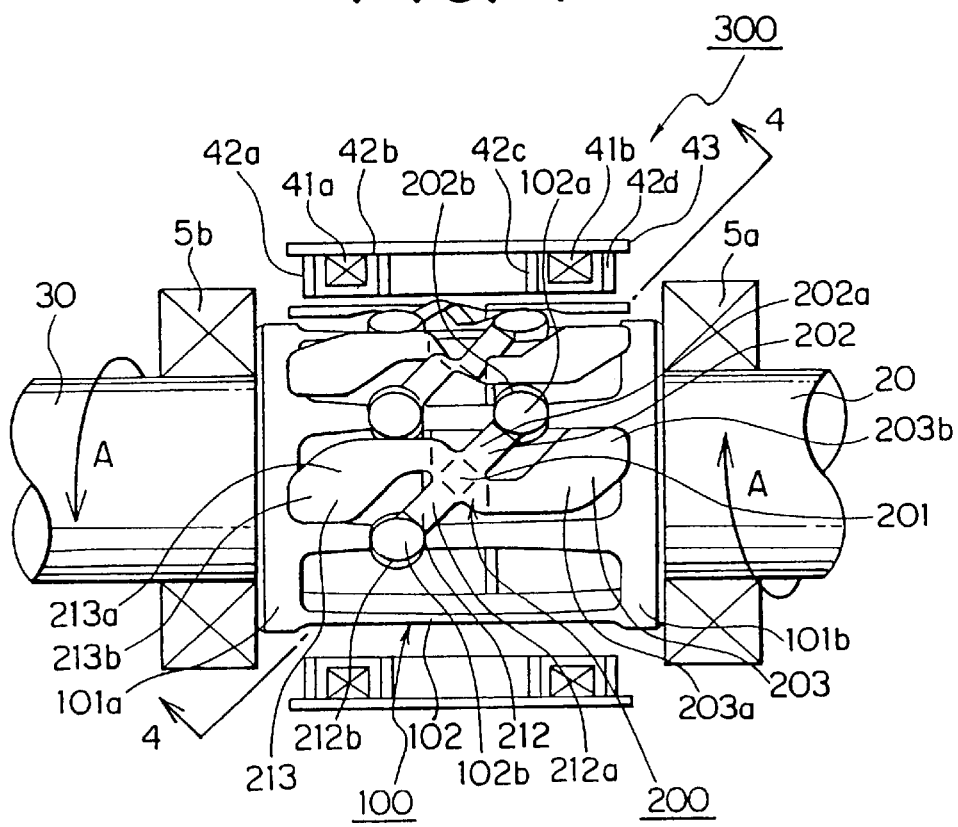
FIG. 1 is a partial cross-sectional view of a front elevation of the torque detector according to Embodiment 1 of the present invention.

FIG. 1 is a partial cross-sectional view of a front elevation of a torque detector 300, which is an embodiment of the present invention. In the figure, parts and portions which are the same as or correspond to those in the conventional example in FIG. 5 will be given the same numbers and duplicate explanations will be omitted.

Figure 3:
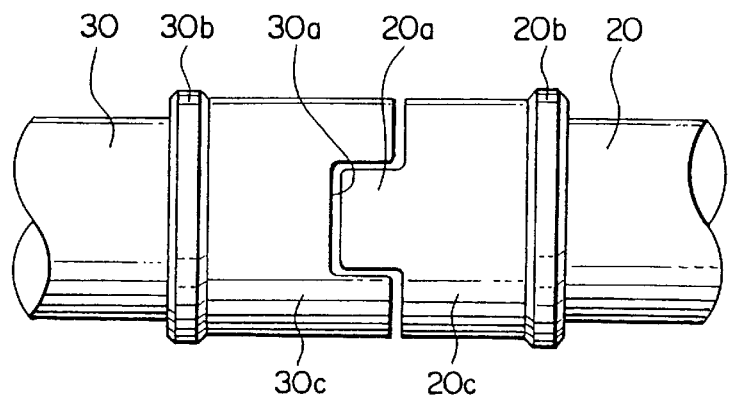
FIG. 3 is a front elevation of the link portion of the upper shaft and the lower shaft of the torque detector according to Embodiment 1 of the present invention.

In the figure, an upper shaft 20, which is a first shaft attached to a steering wheel (not shown), and a lower shaft 30, which is a second shaft attached to the pinion gear of a steering mechanism (not shown), are arranged end to end on a common axis. The upper shaft 20 and the lower shaft 30 are supported by bearings 5a, 5b, respectively, so as to be able to rotate freely. As shown in FIG. 3, which is a front elevation of the link portion of the upper shaft 20 and the lower shaft 30, a protruding portion 20a, which is a rectangular protrusion, and a recessed portion 30a, which is a rectangular groove, are disposed in the facing ends 20c, 30c of the upper shaft 20 and the lower shaft 30, which face each other, and are formed to interlock with moderate play such that relative rotation greater than a certain angle is not possible. Large diameter portions 20b, 30b are also disposed in these ends 20c, 30c, respectively.

In FIG. 1, a cage 100, which is produced by press working a thick-walled hollow cylindrical steel pipe, comprises eight elastic rods 102 arranged in a circle, which are long narrow rods which are elastic and have generally rectangular cross-sections formed from concentric arcs and a pair of straight lines, and hollow cylindrical rings 101a, 101b, which are a pair of annular members which are connected to either end of these elastic rods 102. This cage 100 is secured to the upper shaft 20 and the lower shaft 30 by shrink fitting or welding the rings 101a, 101b to the large diameter portions 20b, 30b.

Movable elements 200, the entire body of each of which is formed from a single sheet and is produced by press working a thin sheet of soft magnetic material, are each provided with: a generally square body portion 201; a first leg 202 and a second leg 212, which form a pair of legs connected to the body portion 201 at their roots; and a first wing 203 and a second wing 213, which form a pair of wings connected to the body portion 201 whose tips 203b, 213b extend along the axis. The tips 202b, 212b of the two legs 202, 212 are secured by spot welding to securing positions 102a, 102b separated from each other axially along neighboring elastic rods 102 such that they lie at roughly 45 degrees to the axis.

Figure 4:
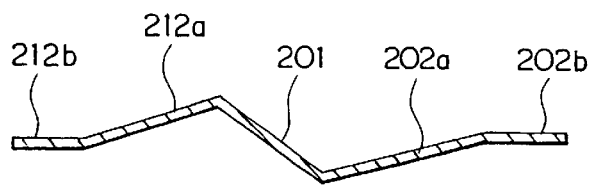
FIG. 4 is a partial cross-sectional view along line IV—IV in FIG. 1.

FIG. 4 is a partial cross-sectional view along line 4—4 showing the portion thereof between the securing positions 102a, 102b. In the figure, the trunk 212a of the second leg 212, which connects the body portion 201 to the tip 212b, which is secured by spot welding, is formed so as to be positioned radially further outwards than the trunk 202a of the first leg 202. Also, the body portion 201 has a flat surface, which is positioned at an angle with respect to an imaginary straight line drawn between the securing positions 102a, 102b.

Returning to FIG. 1, the roots of each first wing 203 and each second wing 213 are connected to the body portion 201 and their tips 203b, 213b extend axially along the elastic rods 102. When there is no torque acting mutually between the upper shaft 20 and the lower shaft 30, the trunks 203a, 213a of each first wing 203 and each second wing 213 lie on the surface of an imaginary cylinder having a common axis with the upper shaft 20 and the lower shaft 30.

Furthermore, in FIG. 1, to make the diagram easier to see, only three movable elements 200 are shown on the cage 100, but there are actually eight movable elements disposed at 45 degree intervals around the cage 100.

Figure 2:
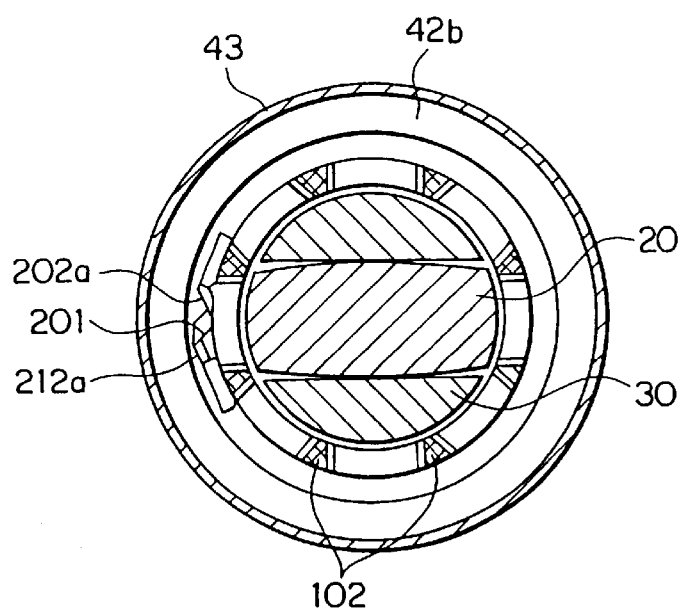
FIG. 2 is a cross-sectional view of an end elevation of the torque detector according to Embodiment 1 of the present invention.

FIG. 2 is a cross-sectional view of an end elevation of the torque detector according to Embodiment 1 of the present invention. To make the figure easier to see, only the body portion 201 and the pair of legs 202, 212 of one movable element 200 are shown, and the first wing 203 and the second wing 213 have been omitted. In the diagram, the trunk 212a of the second leg 212 is formed so as to be positioned radially further outwards than the trunk 202a of the first leg 202.

A pair of coils 41a, 41b, flat ring-shaped yokes 42a, 42b, 42c, 42d, and hollow cylindrical yoke 43 are disposed outside the first wing 203 and the second wing 213, that is, radially outwards from the upper shaft 20 and the lower shaft 30, and face each of the first wings 203 and second wings 213, generate a magnetic flux in a magnetic circuit which includes each of the first wings 203 and second wings 213, and constitute a detection means which detects radial displacement of the first wings 203 and the second wings 213 as electromagnetic change.

Next, the operation of the embodiment of the present invention will be explained.

A steering force generated by a driver turning a steering wheel is transmitted through the upper shaft 20, the cage 100, the lower shaft 30, and the steering mechanism to tires (not shown), and torque acts between the upper shaft 20 and the lower shaft 30 in proportion to the steering force and the load on the tires.

When torque is applied to the upper shaft 20 in the direction of the arrow A in the diagram, the cage 100 is twisted and the elastic rods 102 warp, so that the distance between the securing positions 102a, 102b on the elastic rods 102, to which the movable elements are secured, is extended slightly.

Because the trunk 212a of each of the second legs 212 is formed so as to be positioned radially further outwards than the trunk 202a of each of the first legs 202, each of the body portions 201 is pulled by the legs on either side, and the attitude of each of the body portions 201 changes such that the angle of the flat surface of each body portion, which is positioned at an angle with respect to an imaginary straight line drawn between its respective securing positions 102a, 102b, decreases. As a result, each of the first wings 203 is displaced radially outwards and each of the second wings 213 is displaced radially inwards.

That is, each movable element 200 is secured to and spans two elastic rods 102, and the first wing 203 and the second wing 213 are displaced radially with respect to the upper shaft 20 and the lower shaft 30 in response to the twisting of the elastic rods 102.

When each of the first wings 203 is displaced radially outwards, the gap in the magnetic circuits formed by each of the first wings 203 and the yokes 42c, 43, 42d decreases and the inductance in the coil 41b increases. On the other hand, when each of the second wings 213 is displaced radially inwards, the gap in the magnetic circuits formed by each of the second wings 213 and the yokes 42a, 43, 42b increases and the inductance in the coil 41a decreases. The magnitude of the torque acting mutually between the upper shaft 20 and the lower shaft 30 can be found by detecting these changes in inductance electromagnetically.

The protruding portion 20a on the upper shaft 20 and the recessed portion 30a on the lower shaft 30 interlock with moderate play such that relative rotation greater than a certain angle is not possible, so that the movable elements 200 are not deformed to excess or destroyed.

According to this embodiment of the present invention, the cage 100 has been secured to the curved outer surfaces of both the upper shaft 20 and the lower shaft 30, so that the elastic rods 102 can be connected to the upper shaft 20 and the lower shaft 30 by a simple process.

Also, the cage 100 is produced by press working, so that costs can be reduced.

Figure 5:
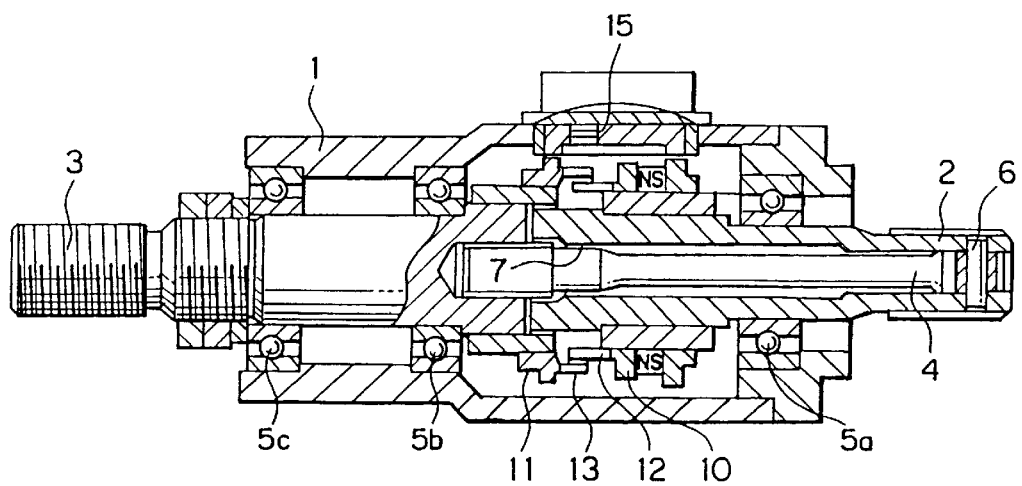
FIG. 5 is a cross-sectional view of a front elevation of a conventional torque detector.

In addition, in the conventional art, the torsion bar 4 had to be secured to the inside of the upper shaft 2 and the lower shaft 3, as shown in FIG. 5, and so welding was not possible, and because the radius of the contact surface between the torsion bar 4 and the upper shaft 2 and the lower shaft 3 was small, it was not possible to obtain sufficient strength to withstand the torque acting between the upper shaft 2 and the lower shaft 3 by press fitting or shrink fitting, but according to the present invention, the rings 101a, 101b of the cage 100 are secured to the curved outer surface of the upper shaft 20 and the lower shaft 30, as shown in FIG. 1, so that securing by welding is possible, enabling production by a simple process. Also, because the radius of the contact surface is large, sufficient strength to withstand the torque acting between the upper shaft 20 and the lower shaft 30 can be attained by shrink fitting alone.

As examples of variations on this embodiment of the present invention, the elastic rods 102 may be secured directly to the facing ends 20c, 30c of the upper shaft 20 and the lower shaft 30 without the mediation of the hollow cylindrical rings 101a, 101b, or a pair of annular members. Methods of securing the elastic rods 102 include: welding; press fitting protruding portions disposed on the elastic rods 102 into grooves or holes disposed in the facing ends 20c, 30c of the upper shaft 20 and the lower shaft 30; or arranging the elastic rods around the outside of the facing ends 20c, 30c of the upper shaft 20 and the lower shaft 30 and fastening them by means of toroidal rings applied radially outside.

The securing position for the rings 101a, 101b or for the elastic rods 102 does not have to be on the curved outer surface of the upper shaft 20 and the lower shaft 30, it may also be on the end surfaces, provided that it is at the facing ends 20c, 30c of the upper shaft 20 and the lower shaft 30.

An inductance comparison circuit has been used to detect the radial displacement of the first wings 203 and the second wings 213 with respect to the upper shaft 20 and the lower shaft 30, but any electromagnetic method using coils may be used including methods such as differential transformer type, detecting reactance due to eddy currents, etc.

In this embodiment of the present invention, each of the movable elements 200 is secured to and spans two elastic rods 102 and serves to enlarge the slight displacement of the elastic rods 102 by means of a body portion 201 and wings 203, 213, but if the twisting of the elastic rods 102 is sufficiently great, movable elements comprising wings alone or a body portion and wings may be secured directly to the central portion of single elastic rods 102. When torque is applied between the upper shaft 20 and the lower shaft 30, the elastic rods 102 will warp and the angle at the center of the elastic rods 102 will change, so that if the movable elements 200 are secured to this position, radial displacement with respect to the upper shaft 20 and the lower shaft 30 can be induced in the wings of the movable 200 elements in response to the torque applied.

According to the present invention, a torque detector for detecting the torque acting mutually between a first shaft and a second shaft which are arranged end to end on a common axis comprises: a plurality of elastic rods, which are secured at each end to the facing ends of the first shaft and the second shaft and are each able to twist in response to this torque; at least one movable element with wings, each of which is secured to and spans two of these elastic rods and is displaced radially with respect to the common axis in response to the twisting of these elastic rods; and a detection means, which is disposed so as to face these wings radially to the axis and which generates a magnetic flux in a magnetic circuit which includes these wings and detects radial displacement of these wings as electromagnetic change; so that a torsion bar is not required, and because the flexural rigidity of the elastic rods which form the link portion between the upper shaft and the lower shaft is great, the number of supports can be reduced, and loss of torque due to supports can be reduced.

According to the present invention, the elastic rods may be secured to the first shaft and the second shaft by means of a pair of annular members, so that a torque detector can be obtained wherein connection of the elastic rods to the first shaft and the second shaft is facilitated and production by a simple process is made possible.

According to the present invention, each of the movable elements may be provided with: a pair of legs composed of elastic bodies, the trunk of one of which is positioned radially outwards from the trunk of the other and whose ends are secured in different securing positions separated from each other axially along the elastic rods; and a body portion, which is connected to the root of each of this pair of legs; wherein the roots of the wings are connected to the body portion and the tips of the wings extend axially along the elastic rods, and the wings are displaced radially in accordance with changes in the attitude of the body portions in response to changes in torque, so that the wings are displaced radially by a large amount with respect to a slight warping of the elastic rods and a highly sensitive torque detector can be obtained.

According to the present invention, two wings and two detection means may be disposed facing each other for each body portion, so that a differential electric circuit can be set up in the detection means and temperature correction, etc., is facilitated. Also, displacement of the wings can be measured at two positions and a highly sensitive torque detector can be obtained.

According to the present invention, the entire body of each movable element may be formed from a single sheet of soft magnetic material, so that a low cost torque detector can be obtained.

What is claimed is:

1. A torque detector for detecting a torque acting mutually between a first shaft and a second shaft arranged end to end on a common axis, comprising:
    a plurality of elastic rods, secured at each end to a facing end of said first shaft and a facing end of said second shaft such that said rods are individually able to twist in response to said torque;
    at least one movable element with wings, wherein said at least one movable element is secured to and spans two of said elastic rods and is displaced radially inwardly and outwardly with respect to said common axis in response to the twisting of said elastic rods;

and detection means, disposed so as to face said wings radially to said common axis and which generates a magnetic flux in a magnetic circuit which includes said wings and detecting said radial displacement of said wings as electromagnetic change.

2. The torque detector according to claim 1, wherein said elastic rods are secured to said first shaft and said second shaft by means of a pair of annular members.

3. The torque detector according to claim 2, wherein each of said movable elements comprises:

a pair of legs composed of elastic bodies, a trunk of one of which is positioned radially outwards from the trunk of the other and whose ends are secured in securing positions separated from each other axially along said different rods;

and a body portion, which is connected to a root of each of said pair of legs;

wherein roots of said wings are connected to said body portion and tips of said wings extend axially along said elastic rods, and said wings are displaced radially in accordance with changes in the attitude of said body portion in response to changes in said torque.

4. The torque detector according to claim 3, wherein each of said body portions has a flat surface positioned at an angle to an imaginary straight line drawn between said securing positions.

5. The torque detector according to claim 4, wherein two of said wings and two of said detection means are disposed facing each other for each of said body portions.

6. The torque detector according to claim 5, wherein the entire body of each of said movable elements is formed from a single sheet of soft magnetic material.

7. The torque detector according to claim 1, wherein each of said movable elements comprises:

a pair of legs composed of elastic bodies, a trunk of one of which is positioned radially outwards from the trunk of the other and whose ends are secured in securing positions separated from each other axially along said different rods;

and a body portion, which is connected to a root of each of said pair of legs;

wherein the roots of said wings are connected to said body portion and tips of the wings extend axially along said elastic rods, and said wings are displaced radially in accordance with changes in the attitude of said body portion in response to changes in said torque.

8. The torque detector according to claim 7, wherein each of said body portions has a flat surface positioned at an angle to an imaginary straight line drawn between said securing positions.

9. The torque detector according to claim 8, wherein two of said wings and two of said detection means are disposed facing each other for each of said body portions.

10. The torque detector according to claim 9, wherein the entire body of each of said movable elements is formed from a single sheet of soft magnetic material.

11. The torque detector according to claim 1, wherein each of said body portions has a flat surface positioned at an angle to an imaginary straight line drawn between said securing positions.

12. The torque detector according to claim 11, wherein two of said wings and two of said detection means are disposed facing each other for each of said body portions.

13. The torque detector according to claim 12, wherein the entire body of each of said movable elements is formed from a single sheet of soft magnetic material.

14. The torque detector according to claim 1, wherein two of said wings and two of said detection means are disposed facing each other for each of said body portions.

15. The torque detector according to claim 14, wherein the entire body of each of said movable elements is formed from a single sheet of soft magnetic material.

16. The torque detector according to claim 1, wherein the entire body of each of said movable elements is formed from a single sheet of soft magnetic material.

* * * * *